United States Patent Office 2,882,198
Patented Apr. 14, 1959

2,882,198

PESTICIDAL PHOSPHORUS ESTERS

Joe R. Willard and John F. Henahan, Middleport, N.Y., assignors to Food Machinery and Chemical Corporation, New York, N.Y., a corporation of Delaware No Drawing. Original application July 16, 1956, Serial No. 597,886. Divided and this application May 19, 1958, Serial No. 739,959

2 Claims. (Cl. 167—30)

This invention relates to novel pesticidal compositions, and particularly to compositions which are useful as insecticides, acaricides and ovicides. More specifically, it has been discovered that compounds of the class of bis-(S-(dialkoxyphosphinyl)mercapto)methanes and bis(S-(dialkoxyphosphinothioyl)mercapto)methanes possess unique pesticidal activity, in that they function as effective active ingredients in insecticidal compositions, acaricidal compositions and ovicidal compositions. The subject compounds have the general formula

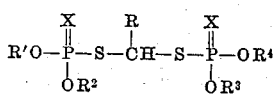

wherein X is oxygen or sulfur, R is hydrogen or an organic radical, and R', R$^2$, R$^3$ and R$^4$ are organic radicals.

Compounds of this general type have reportedly been prepared within the —CHR— group in the foregoing structural formula is derived from an aldehyde. It has now been discovered that a large variety of substituted methylene esters of this type may be prepared from a methylene dihalide having the general formula

Y—CHR—Z wherein Y and Z may be chlorine or bromine. In addition to hydrogen, the R group of the dihalide may be a hydrocarbon radical such as alkyl, aryl, cycloalkyl, aralkyl, alkaryl and the like, or R may be a substituted hydrocarbon, containing groups such as chloro, bromo, nitro, alkoxy, hydroxy and the like, or R may be a functional group such as carbalkoxy, carbamido, carbanilido, halogen, alkoxy, nitro and the like. The use of the halide rather than the aldehyde greatly enlarges the number and types of substituents which may be represented by R.

The methylene dihalide is condensed with a metallic salt of a thio- or dithiophosphoric acid, of the formula

such as the alkali metal and alkaline earth salts and the ammonium and silver salts, generally in the presence of a solvent. The radicals R' and R$^2$ may be hydrocarbon radicals such as alkyl, cycloalkyl or aryl, for example, or they may be substituted hydrocarbons containing such substituents as chloro, bromo, alkoxy, nitro, and the like. Generally R$^3$ and R$^4$ correspond to R' and R$^2$, although they may be different if the reaction is carried out in two stages.

In the preferred process of this invention, two molar equivalents of the appropriate phosphorothioic or phosphorodithioic acid is dissolved in a solvent such as ethanol or dioxane, and a solution of the metal hydroxide is added until the pH is about seven. A 25–40% solution of potassium hydroxide in ethanol is a convenient reagent. A preformed salt of the phosphorus acid may also be used, dissolved in a solvent. To the neutral solution is added one molar equivalent of the desired methylene or substituted methylene dihalide, and the mixture is heated until the reaction is complete. This generally requires about 4–14 hours under reflux. The product is separated and tested for pesticidal activity.

The following examples illustrate the preparation of typical compounds. There are of course many modifications of these techniques which may be successfully employed by those skilled in the art, and which do not depart from the spirit and scope of the invention.

EXAMPLE 1

Bis(S-(diethoxyphosphinothioyl)mercapto)methane

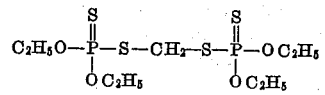

Two molar equivalents of O,O-diethyl hydrogen phosphorodithioate were dissolved in sufficient ethanol to give a four molar solution. 20% ethanolic potassium hydroxide was added slowly, the temperature maintained below 50° during the addition, until the pH of the solution was approximately 7.0. To the neutral solution was added 1 molar equivalent of dibromomethane and the mixture was heated under reflux for six hours. The precipitated solid was isolated on a filter and the filtrate was concentrated under vacuum. The residue after removing the solvent was diluted with ether, the solution washed with two volumes of water and the ethereal layer dried. The dried solution was concentrated under vacuum to give 0.74 molar equivalent of a colorless liquid having an n 25D 1.5315. Analysis: Calcd. for C$_9$H$_{22}$O$_4$P$_2$S$_4$: P 16.13, S 33.34; P/S ratio 0.50. Found: P 16.04, S 33.72; P/S ratio 0.51.

When the dibromomethane in the above procedure was replaced by chlorobromomethane, 0.78 molar equivalent of colorless liquid having an n 25D 1.5285 was obtained. Bio-assay, and chemical analysis, indicated the two products to be identical. Analysis: Calcd. for C$_9$H$_{22}$O$_4$P$_2$S$_4$: P 16.13, S 33.34; P/S 0.50. Found: P 16.25, S 33.63; P/S ratio 0.50.

EXAMPLE 2

Bis(S-(dicyclohexyloxyphosphinothioyl)mercapto)-methane

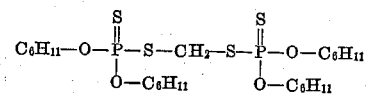

Two molar equivalents of O,O-diccyclohexyl hydrogen phosphorodithioate was neutralized by addition of 20% ethanolic potassium hydroxide, the temperature maintained below 50° during the addition, and to the neutral solution was added one molar equivalent of dibromomethane. The mixture was heated under reflux for 2.5 hours and the reaction mixture treated as described in Example 1 to give 0.40 molar equivalent of a viscous orange-brown liquid having an n 25D 1.5290. Analysis: Calcd. for C$_{25}$H$_{46}$O$_4$P$_2$S$_4$; P 10.32, S 21.34; P/S ratio 0.50. Found: P 10.45, S 21.29; P/S ratio 0.51.

EXAMPLE 3

(4-nitrophenyl)-bis(S-(diethoxyphosphinothioyl)-mercapto)methane

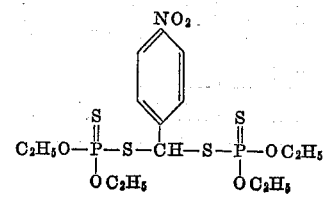

Two molar equivalents of potassium O,O,-diethyl phosphorodithioate was reacted with one molar equivalent of 4-nitrobenzal chloride as described in Example 1. From the reaction mixture was obtained 0.52 molar equivalent of a red-orange liquid having an n 25D 1.5753. Analysis: Calcd. for $C_{15}H_{25}O_6S_4P_2N$: P 12.25, S 25.37; P/S ratio 0.50. Found: P 12.20, S 25.70; P/S 0.49.

EXAMPLE 4

Bis(S-(diethoxyphosphinyl)mercapto)methane

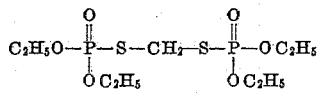

To an ethanolic solution containing 2 molar equivalents of sodium O,O-diethylphosphorothiolate, prepared by reaction of elemental sulfur with O,O-diethyl phosphite according to the procedure of Fiszer et al. (Chem. Abstracts, 49, 3786(1955)), was added one molar equivalent of dibromomethane. The reaction mixture was heated under reflux for six hours and the product recovered as described in Example 1, to give 0.23 molar equivalent of dark red liquid having an n 25D 1.4678. Analysis: Calcd. for $C_9H_{22}O_6P_2S_2$: P 17.58, S 18.20; P/S ratio 1.00. Found: P 19.80, S 20.40; P/S ratio 1.00.

In Tables 1 and 2, which follow, are tabulated the descriptions, refractive indices and analyses of a number of compounds of this invention which have not before been described or characterized in the chemical literature. These compounds may be prepared by procedures similar to those described in the foregoing examples.

The compounds of this invention were evaluated for pesticidal activity. It was found that all were not equivalent in activity, but that some were superior as insecticides, some as acaricides and some as ovicides, and that some showed systemic activity as well. Some of the compounds in this group showed an unusually broad range of activity characterized by high toxicity.

The pesticidal compositions may be formulated as aqueous emulsions, as dry or wettable powders, as solutions, or in any other suitable vehicle. The compositions can be utilized as sprays, as dusts, as aerosol mixtures, insecticidal coating compositions, and as residues. In general, they can be applied by methods commonly used for control or eradication of insects, mites and the like. Thus, these compositions may be formulated with solvents, diluents, and carrier media, adhesives, spreading, wetting and emulsifying agents and other ingredients.

A typical formulation used in evaluating the toxicants of this invention is a wettable powder containing 25% of the candidate pesticide, 72% attaclay (fuller's earth) and 3% of an alkyl aryl polyether alcohol as wetting agent. This wettable powder is applied to plant foilage as an aqueous suspension, by spraying. The treated plants are infested and observations made at intervals to determine the efficacy of the compounds as toxicants.

Insects used in the testing included the German roach (Blattela germanica (L.)), Mexican bean beetle (Epilachnia varivestis Muls.), southern armyworm (Prodenia eridania (Cram.)), pea aphid (Macrosiphum pisi (Kltb.)), confused flour beetle (Tribolium confusum Duv.) and two-spotted mite (Tetranychus bimaculatus Harvey).

TABLE 1.—PHOSPHINOTHIOYL- AND PHOSPHINYLMERCAPTO-METHANES

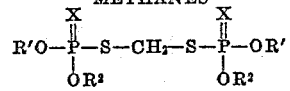

| Compound | | | $n_{25}$ D | Analysis | |
|---|---|---|---|---|---|
| R' | R² | X | | Theory | Found |
| Methyl | Methyl | S | 1.5247 | P-18.89 | P-17.39 |
| Ethyl | Ethyl | S | 1.5315 | P-16.13 | P-16.04 |
| Do | do | O | 1.4678 | P-17.58 | P-19.80 |
| n-Propyl | n-Propyl | S | 1.5220 | P-14.08 | P-14.04 |
| Isopropyl | Isopropyl | S | 1.5163 | P-14.08 | P-14.06 |
| n-Butyl | n-Butyl | S | 1.5110 | P-12.49 | P-12.18 |
| Isobutyl | Isobutyl | S | 1.5088 | P-12.49 | P-12.18 |
| Ethyl/isopropyl (1:1) | Ethyl/isopropyl (1:1) | S | 1.5258 | P-15.04 | P-15.09 |
| Ethyl/isopropyl (3:1) | Ethyl/isopropyl(3:1) | S | 1.5298 | P-15.57 | P-15.60 |
| Cyclohexyl | Cyclohexyl | S | 1.5290 | P-10.32 | P-10.49 |
| Phenyl | Phenyl | S | 1.5722 | P-10.74 | P-10.83 |
| p-Chlorophenyl | p-Chlorophenyl | S | 1.5805 | P-8.67 | P-8.51 |
| Ethyl | Phenyl | S | 1.5350 | P-12.87 | P-12.47 |

TABLE 2.—SUBSTITUTED PHOSPHINOTHIOYL- AND PHOSPHINYLMER-CAPTOMETHANES.

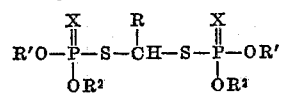

| Compound | | | | $n_{25}$ D | Analysis | |
|---|---|---|---|---|---|---|
| R' | R² | R | X | | Theory | Found |
| Ethyl | Ethyl | Phenyl | S | 1.5497 | P-17.47 | P-12.91 |
| Do | do | do | O | 1.5170 | | |
| Phenyl | Phenyl | do | S | 1.5853 | P-9.66 | P-10.20 |
| 4-chlorophenyl | 4-chlorophenyl | do | S | 1.5630 | P-7.94 | P-8.08 |
| Ethyl | Ethyl | 2,6-dichlorophenyl | S | 1.5712 | P-11.70 | P-11.95 |
| Do | do | 4-nitrophenyl | S | 1.5753 | P-12.25 | P-12.20 |
| Do | do | do | O | 1.5352 | S-13.55 | S-12.95 |
| Do | do | Carbethoxy | S | 1.5123 | | |
| Do | do | N,N-ditheyl-carbamido | S | 1.5078 | P-12.87 | P-12.51 |
| Do | do | N-phenylcarbamido | S | 1.5532 | | |

Table 3 below represents the results of screening tests of various bis(S-(dialkoxyphosphinothioyl)mercapto) methanes. A number of these compounds exhibited residual, slow acting or ovicidal activity against two-spotted mites, and residual activity against Mexican bean beetles and pea aphids. A plus (+) sign in Table 3 indicates significant ovicidal activity.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the inven- TABLE 3.—INITIAL CONTACT ACTIVITY OF BIS(S-(DIALKOXYPHOSPHINOTHIOYL)MERCAPTO) METHANES

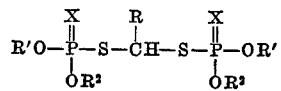

| Compound | | | | Percent kill at 1,250 p.p.m. | | | | | | |
|---|---|---|---|---|---|---|---|---|---|---|
| R' | R² | R | X | Two-spotted mites | | | German roach | Mexican bean beetle | Southern armyworm | Pea aphid |
| | | | | Adults | Nymphs | Ova | | | | |
| Methyl | Methyl | Hydrogen | S | 96 | 75 | — | 0 | 0 | 0 | 0 |
| Ethyl | Ethyl | do | S | 100 | 100 | + | 100 | 100 | 95 | 100 |
| Do | do | do | O | 100 | 100 | — | 100 | 100 | 5 | 100 |
| Isopropyl | Isopropyl | do | S | 95 | 90 | — | 0 | 50 | 100 | 65 |
| Phenyl | Phenyl | do | S | 100 | 100 | — | 0 | 90 | 0 | 0 |
| 4-chlorophenyl | 4-chlorophenyl | do | S | 100 | 100 | + | 0 | 100 | 0 | 0 |
| Ethyl | Phenyl | do | S | 100 | 100 | + | 90 | 100 | 0 | 15 |
| Do | Ethyl | Carbethoxy | S | 100 | 100 | + | 100 | 100 | 100 | 45 |
| Do | do | Phenyl | S | 100 | 100 | — | 0 | 100 | 15 | 0 |
| Do | do | 2,6-dichlorophenyl | S | 91 | 95 | — | 0 | 0 | 60 | 0 |
| Do | do | N,N-diethylcarbamido | S | 100 | 100 | + | | 100 | 100 | 100 |
| Do | do | N-phenylcarbamido | S | 100 | 100 | — | | 25 | 55 | 10 |

To measure ovicidal activity, horticultural bean plants were infested with adult two-spotted mites. A period of four to five hours was allowed for the deposition of eggs. The ovicidal materials were then applied to the eggs by dipping the leaves into aqueous suspensions of wettable powder formulations of these materials one and three days after infestation. Ovicidal activity against Mexican bean beetle ova was measured by dipping one-day-old egg masses in an aqueous suspension of a wettable powder formulation of the test material and maintaining the wet egg masses at room temperature for 6 days.

Test results are shown in Table 4, for ovicidal activity of bis(S-(diethoxyphosphinothioyl)mercapto)methane against Mexican bean beetle and two-spotted mite eggs.

TABLE 4.—OVICIDAL ACTIVITY OF BIS-(S-(DIETHOXYPHOSPHINOTHIOYL)MERCAPTO)METHANE.

| Ova | Conc. of active compd. in p.p.m. | Behavior of week-old eggs |
|---|---|---|
| Mexican bean beetle (treated one-day-old). | 1,250 | Deteriorated without hatching. |
| | 39 | Hatched, all larva died instantly. |
| | 0 | Hatched, larva normal. |
| Two-spotted mite (treated one-day-old). | 156 | 0% hatched. |
| | 78 | Do. |
| | 39 | Do. |
| | 20 | 8% hatched. |
| | 10 | 42% hatched. |
| | 5 | 100% hatched. |
| Two-spotted mite (treated 3-days-old). | 156 | 0% hatched. |
| | 78 | Do. |
| | 39 | Do. |
| | 20 | 2% hatched. |
| | 10 | 10% hatched. |
| | 5 | 59% hatched. |
| | 0 | 98% hatched. | tion may be practiced by those skilled in the art, and having the benefit of this disclosure, otherwise than as specifically described and exemplified herein.

That which is claimed as patentably novel is:

1. A pesticidal composition comprising as an active ingredient a toxic concentration of the compound bis(S-[diethoxyphosphinothioyl]mercapto)(phenyl)methane of the formula

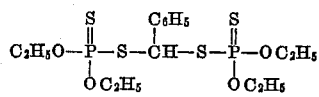

and an inert pesticidal adjuvant as carrier therefor.

2. A method for controlling mite and insect pests and ova which comprises contacting said pests and ova with an effective concentration of the compound bis(S-[diethoxyphosphinothioyl]mercapto)(phenyl)methane.

References Cited in the file of this patent

UNITED STATES PATENTS

| 2,266,514 | Romieux | Dec. 16, 1941 |
| 2,596,076 | Hook | May 6, 1952 |
| 2,736,737 | Morris | Feb. 28, 1956 |